United States Patent
Jin et al.

(10) Patent No.: US 7,656,763 B1
(45) Date of Patent: Feb. 2, 2010

(54) CALIBRATING A DEFECT SCAN PARAMETER FOR A DISK DRIVE

(75) Inventors: Ming Jin, Lake Forest, CA (US); Teik Ee Yeo, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 409 days.

(21) Appl. No.: 11/757,824

(22) Filed: Jun. 4, 2007

(51) Int. Cl.
*G11B 5/09* (2006.01)

(52) U.S. Cl. .............. 369/53.15; 369/53.17; 369/47.14; 369/44.32

(58) Field of Classification Search ....................... None
See application file for complete search history.

(56) References Cited

U.S. PATENT DOCUMENTS

| | | | |
|---|---|---|---|
| 5,195,076 A * | 3/1993 | Aoki ........................ | 369/53.15 |
| 5,280,395 A | 1/1994 | Matsuzaki | |
| 6,366,081 B1 | 4/2002 | Tan et al. | |
| 6,504,662 B2 | 1/2003 | Sobey | |
| 6,606,211 B1 | 8/2003 | Lim et al. | |
| 6,731,442 B2 | 5/2004 | Jin et al. | |
| 6,947,232 B2 | 9/2005 | Lim et al. | |
| 7,072,129 B1 | 7/2006 | Cullen et al. | |
| 2004/0153949 A1 | 8/2004 | Ro et al. | |
| 2005/0180282 A1* | 8/2005 | Ouyang et al. ........... | 369/53.16 |

* cited by examiner

*Primary Examiner*—Muhammad N. Edun
(74) *Attorney, Agent, or Firm*—Howard H. Sheerin, Esq.

(57) ABSTRACT

A method is disclosed for performing a defect scan for a disk drive. Data is recorded on a first data area of a disk substantially free from defects and on a second data area of the disk substantially affected by at least one defect. A defect scan parameter is initialized with an initial setting. The first data area is read to determine a first defect threshold, and the second data area is read to determine a second defect threshold. A margin is saved representing a difference between the first and second defect thresholds. The setting for the defect scan parameter is adjusted, and the elements of reading the first and second data areas and saving a corresponding margin are repeated at least once. A setting is then selected for the defect scan parameter in response to the saved margins.

23 Claims, 7 Drawing Sheets

CALIBRATING A DEFECT SCAN PARAMETER FOR A DISK DRIVE

BACKGROUND

1. Field

The present invention relates to disk drives for computer systems. In particular, the present invention relates to calibrating a defect scan parameter for a disk drive.

2. Description of the Related Art

The disk in a disk drive is coated with a magnetic material which is magnetized with a write element (e.g., a write coil) in order to record information onto the surface of the disk. Various influences may render portions of the disk surface unusable (i.e., defective), for example, if the magnetic coating is not evenly applied to the disk surface or if a particle contaminates the magnetic coating. During a manufacturing "defect scan" procedure, the defective areas of the disk are located and "mapped out" so they are not used during normal operation. The defect scan typically entails writing a high frequency pattern (e.g., a 2T pattern) to the disk, and then reading the high frequency pattern while monitoring a quality metric, such as an amplitude of the read signal, a mean-squared-error of the read signal, a bit error of the read signal, a timing error of the read signal, or the output of defect scan filters having impulse responses matched to defect signatures. If the quality metric falls below a predetermined defect scan threshold, a defect is detected.

The disk is typically formatted to comprise a plurality of radially spaced, concentric data tracks each comprising a number of data sectors, wherein the defect scan maps defective data sectors to spare data sectors. If a defective data sector is not detected during the defect scan procedure, there is a risk of catastrophic data loss, either immediately, or over time as the uniform alignment of the magnetic grains deteriorates (magnetic entropy). Conversely, if the defect scan threshold is set too low in an attempt to detect more defective data sectors, more good data sectors will be identified as defective and mapped out unnecessarily, thereby reducing the capacity and performance of the disk drive.

There is, therefore, a need to improve the defect scan procedure of a disk drive by reducing the chance of missing defective data sectors without significantly increasing the number of good data sectors identified as defective.

SUMMARY OF THE EMBODIMENTS OF THE INVENTION

An embodiment of the present invention comprises a method of performing a defect scan for a disk drive, the disk drive comprising a disk, and a head actuated over the disk. Data is recorded on a first data area of the disk substantially free from defects and on a second data area of the disk substantially affected by at least one defect. A defect scan parameter is initialized with an initial setting. The first data area is read to determine a first defect threshold, and the second data area is read to determine a second defect threshold. A margin is saved representing a difference between the first and second defect thresholds. The setting for the defect scan parameter is adjusted, and the elements of reading the first and second data areas and saving a corresponding margin are repeated at least once. A first setting is then selected for the defect scan parameter in response to the saved margins.

In one embodiment, the first setting selected for the defect scan parameter corresponds to the maximum saved margin.

In another embodiment, the defect scan parameter comprises at least one of a write current of the head, a read bias of the head, a fly-height of the head, a write current overshoot of the head, an equalizer parameter for configuring an equalizer circuit, and a gain control parameter for configuring a gain control circuit.

In still another embodiment, the first setting for the defect scan parameter is copied to a production disk drive, and the defect scan is performed within the production disk drive in response to the first setting.

In yet another embodiment, a defect threshold is selected in response to the saved margins, and in one embodiment, the selected defect threshold is copied to a production disk drive, and the defect scan performed within the production disk drive.

In another embodiment, data is recorded on a third data area of the disk substantially affected by at least one defect. The third data area is read to determine a third defect threshold. A margin is saved representing a difference between the first and third defect thresholds. The setting for the defect scan parameter is adjusted, and the elements of reading the first and third data areas and saving the corresponding margin is repeated at least once. A second setting is selected for the defect scan parameter in response to the saved margins, and a third setting is selected for the defect scan parameter in response to the first and second settings. The defect scan is then performed in response to the third setting selected for the defect scan parameter.

Another embodiment of the present invention comprises a disk drive including a disk comprising a first data area substantially free from defects and on a second data area substantially affected by at least one defect. A head is actuated over the disk, and control circuitry within the disk drive performs a defect scan. A defect scan parameter is initialized with an initial setting. The first data area is read to determine a first defect threshold, and the second data area is read to determine a second defect threshold. A margin is saved representing a difference between the first and second defect thresholds. The setting for the defect scan parameter is adjusted, and the elements of reading the first and second data areas and saving a corresponding margin are repeated at least once. A first setting is then selected for the defect scan parameter in response to the saved margins.

DETAILED DESCRIPTION OF EMBODIMENTS OF THE INVENTION

Figures 1A, 1B:
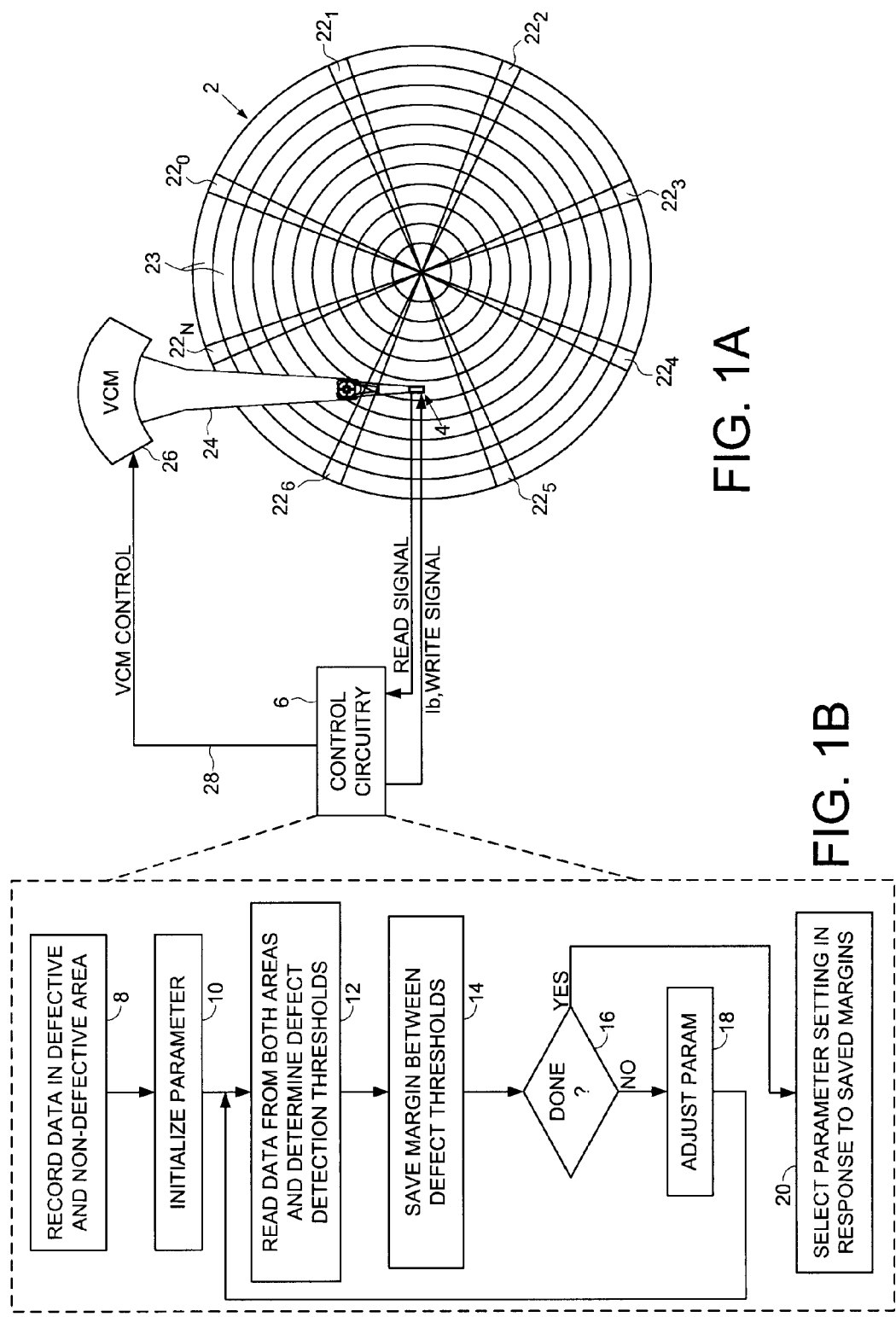
FIG. 1A shows a disk drive according to an embodiment of the present invention comprising a head actuated over a disk, and control circuitry for performing a defect scan.
FIG. 1B is a flow diagram according to an embodiment of the present invention for calibrating a setting for a defect scan parameter, such as a write current setting, by evaluating a margin between defect thresholds determined for a first non-defective data area and a second defective data area.

FIG. 1A shows a disk drive according to an embodiment of the present invention comprising a disk 2, and a head 4 actuated over the disk 2. Control circuitry 6 executes the flow diagram shown in FIG. 1B to calibrate a setting for a defect scan parameter, wherein at step 8 data is recorded on a first data area of the disk 2 substantially free from defects and on a second data area of the disk 2 substantially affected by at least one defect. At step 10, a defect scan parameter is initialized with an initial setting. At step 12, the first data area is read to determine a first defect threshold, and the second data area is read to determine a second defect threshold. At step 14, a margin is saved representing a difference between the first and second defect thresholds. If the calibration process is not finished at step 16, then at step 18 the setting for the defect scan parameter is adjusted, and the flow diagram of FIG. 1B is repeated starting at step 12. When the calibration is finished at step 16 (e.g., after sweeping through all possible settings for the defect scan parameter), at step 20 a first setting is selected for the defect scan parameter in response to the margins saved at step 14.

In one embodiment, the disk drive of FIG. 1A comprises a production disk drive, and in an alternative embodiment, the disk drive of FIG. 1A comprises a special manufacturing disk drive, such as a spin stand. In one embodiment, each production disk drive executes the flow diagram of FIG. 1B to calibrate the setting for the defect scan parameter before performing the defect scan. In an alternative embodiment, the setting for the defect scan parameter is calibrated once for a predetermined number of disk drives (e.g., a family of disk drives or a group of disk drives employing a particular vendor component), and the calibrated setting is copied into each production disk drive for performing the defect scan.

In the embodiment of FIG. 1A, the disk 2 comprises a plurality of embedded servo sectors $22_0$-$22_N$ that define a plurality of data tracks 23. The head 4 is connected to a distal end of an actuator arm 24 which is rotated about a pivot by a voice coil motor (VCM) 26 in order to actuate the head 4 radially over the disk 2. The control circuitry 6 processes the read signal emanating from the head 4 to demodulate the information in the embedded servo sectors. The demodulated servo information is then processed (e.g., using appropriate compensation filtering) to generate a position control signal 28 applied to the VCM 26 in order to position the head 4 over a target data track. In one embodiment, each data track is partitioned into a number of data sectors, wherein write/read operations are performed on one or more data sectors at a time.

In one embodiment, the first non-defective data area on the disk 2 and the second defective data area on the disk 2 are identified by performing a preliminary defect scan of each data sector using nominal settings for the defect scan parameters. The read signal is processed using a suitable defect detection algorithm to identify a first area on the disk (e.g., a first data sector) that is substantially free from defects, and a second area on the disk (e.g., a second data sector) that is substantially affected by a defect. In one embodiment, a histogram is generated for the result of the preliminary defect scan for each data sector. For example, if the amplitude of the read signal is used to detect defects, a histogram is generated wherein each "bucket" of the histogram represents an amplitude of the read signal. After generating the histogram for all of the data sectors, the histogram is evaluated to determine the most likely defect, that is, the bucket in the histogram that contains the most data sectors (and also corresponds to a defect). The data area substantially affected by a defect is then selected as one or more of the data sectors selected from that bucket, and the data area substantially free of detects is selected from a bucket of the histogram corresponding to a level just beyond that considered to be defective. Once the first and second data areas are identified, the flow diagram of FIG. 1B is executed to determine the setting for at least one defect scan parameter that maximizes the margin between the corresponding defect thresholds.

Figure 2A:
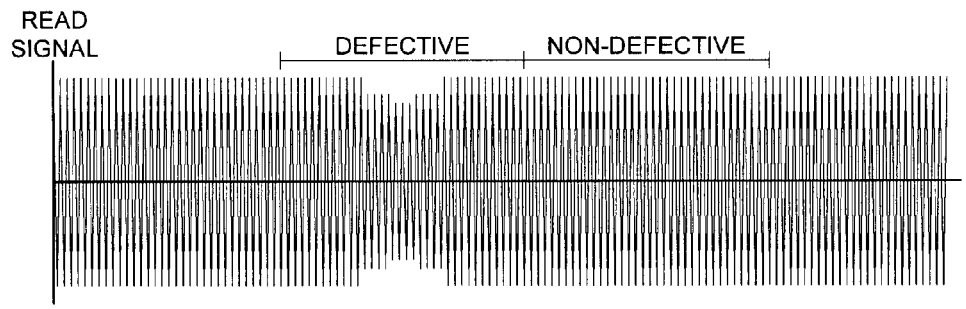
FIG. 2A illustrates a read signal corresponding to a 2T pattern written in the first and second data areas.
Figure 2B:
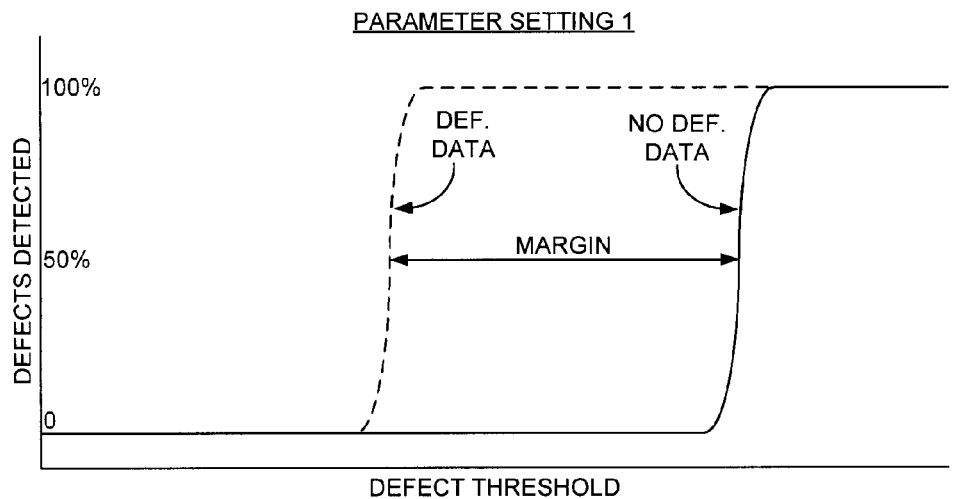
FIG. 2B illustrates a margin between two defect thresholds for the first and second data areas corresponding to a first setting of a defect scan parameter, such as a first write current setting.
Figure 2C:
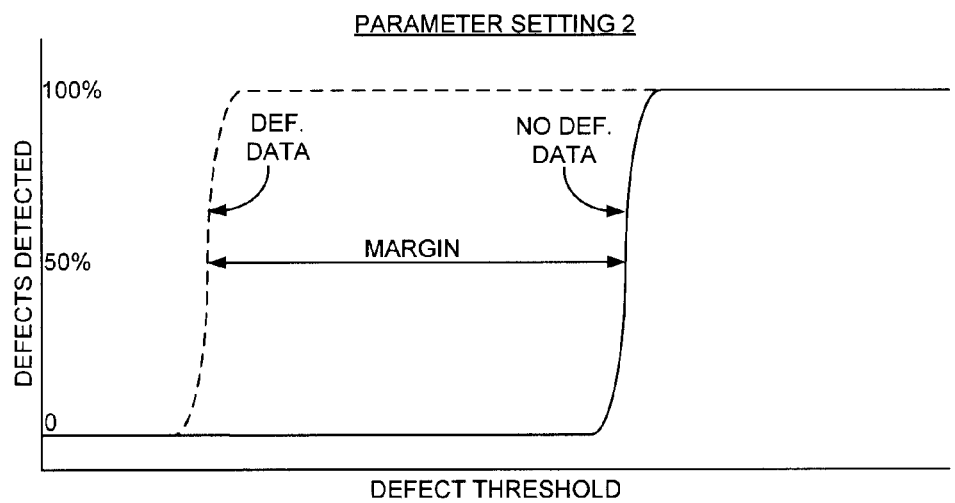
FIG. 2C illustrates a margin between two defect thresholds for the first and second data areas corresponding to a second setting of the defect scan parameter, such as a second write current setting.

This embodiment is better understood with reference to FIGS. 2A-2C, wherein FIG. 2A illustrates the read signal when reading data (e.g., 2T data) from the defective data area and the non-defective data area. Each data area is read a number of times, wherein during each read the data area is identified as either non-defective or defective based on a first defect parameter setting (e.g., a first write current setting). FIG. 2B illustrates, for a first defect scan parameter setting, the percentage of reads wherein the data area is identified as defective (y-axis) relative to a defect scan threshold (x-axis). At low defect scan thresholds, the data areas are identified as non-defective during every read operation. As the defect scan threshold increases (along the x-axis), the defective data area is identified as defective during at least one read operation, and then gradually increases as the threshold increases until the defective area is identified as defect during 100% of the read operations. A similar curve is shown for the non-defective data area wherein at some point along the x-axis, even the non-defective data area is identified as defective during 100% of the read operations. A margin between the defect thresholds corresponding to the two curves is determined using any suitable criteria, for example, the difference between the defect thresholds when both curves reach 50% as illustrated in FIG. 2B.

Figure 2D:
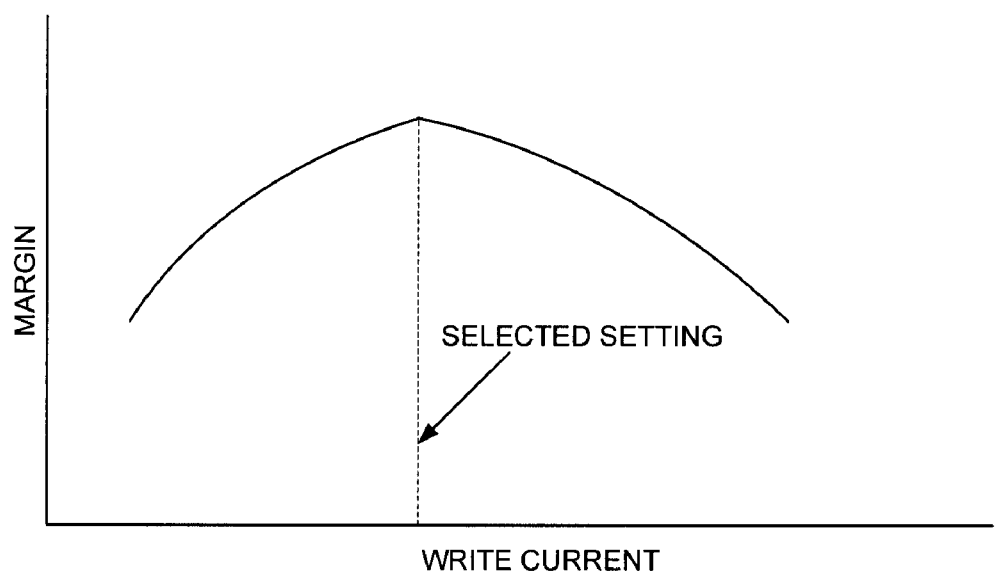
FIG. 2D illustrates an embodiment of the present invention wherein the setting for the defect scan parameter is selected that maximizes the margin.

FIG. 2C shows similar curves for the defective and non-defective data areas for a second defect scan parameter setting (e.g., a second write current setting). A corresponding margin between the defect thresholds at 50% is also shown which is greater than the margin shown in FIG. 2B. Therefore, in one embodiment, the second defect scan parameter setting would be selected for performing the defect scan in a production disk drive since the second setting corresponds to a larger margin. FIG. 2D illustrates an embodiment of the present invention wherein the curves shown in FIG. 2B are generated over a plurality of settings for the defect scan parameter (e.g., write current), and a corresponding margin between the curves is saved. The setting that generates the maximum margin is then selected for the defect scan in a production disk drive.

Any suitable defect scan parameter may be calibrated in the embodiments of the present invention. In one embodiment, the defect scan parameter comprises at least one of a write current of the head, a read bias of the head, a fly-height of the head, a write current overshoot of the head, an equalizer parameter for configuring an equalizer circuit, and a gain control parameter for configuring a gain control circuit.

In one embodiment, the read bias of the head comprises a bias current setting for a magnetoresistive (MR) element, wherein the defect scan parameter comprises a magnitude of the bias current. In another embodiment, the fly-height of the head is adjusted using a dynamic fly height heater for heating the head in order to adjust the fly-height, wherein the parameter setting comprises a heater setting, such as a current applied to the heater. In the embodiment wherein the defect scan parameter comprises a write current overshoot, the parameter setting may comprise a magnitude or duration of write current overshoot applied to the head.

In one embodiment, the gain control circuit and equalizer circuit are implemented within a read channel, wherein the gain control adjusts an amplitude of the read signal emanating from the head, and the equalizer filters the read signal according to a target response. The parameter setting may comprise a target amplitude for the read signal used to generate the error for adjusting the gain of the gain control circuit. In another embodiment, the defect scan parameter may comprise a coefficient of the equalizer, or a target response of the equalizer.

Figure 3A:
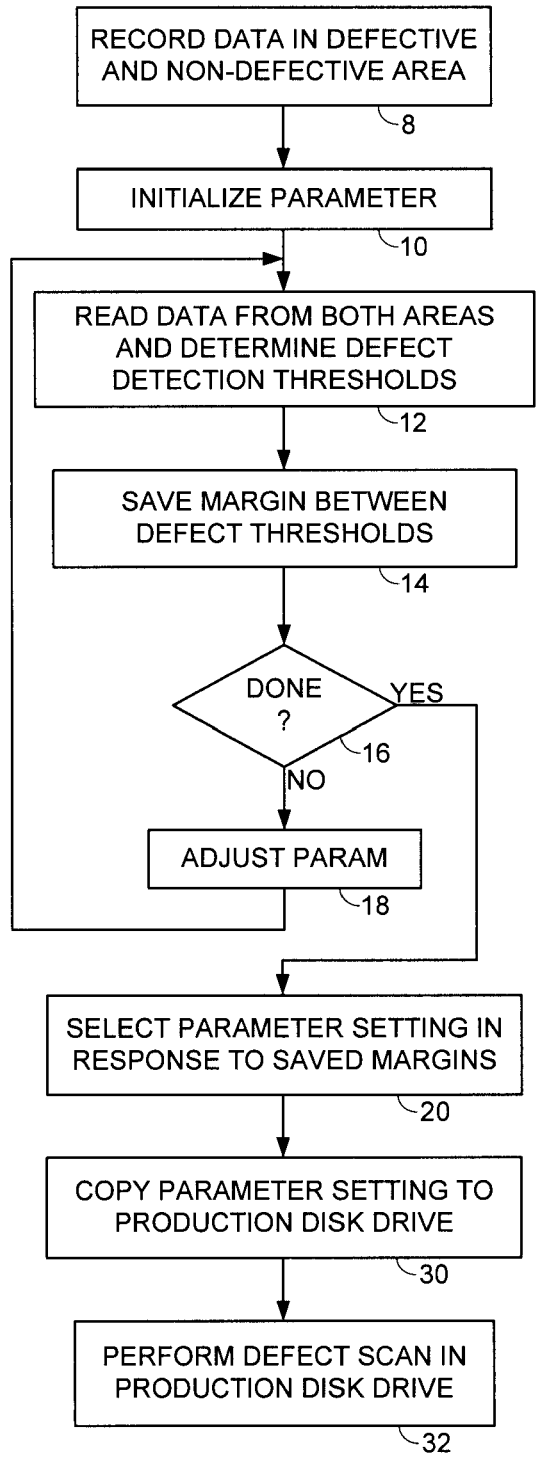
FIG. 3A is a flow diagram according to an embodiment of the present invention for measuring a margin between defect thresholds over a plurality of settings for a defect scan parameter, selecting a setting in response to the margins, and copying the selected setting into each production disk drive for performing a defect scan.

In one embodiment, the setting for the defect scan parameter is calibrated during a manufacturing process within a calibration disk drive (or disk drives). For example, the calibration procedure may be executed on a subset of a family of disk drives to determine the optimal setting for the defect scan parameter, and the calibrated setting is then copied to each production disk drive. This embodiment is illustrated in the flow diagram of FIG. 3A which is an extension of the flow diagram of FIG. 1B, wherein at step 30 the calibrated defect scan parameter setting is copied to a production disk drive, and at step 32 the production disk drive performs the defect scan using the parameter setting. In an alternative embodiment, each production disk drive may calibrate the defect scan parameter (or parameters) by executing the flow diagram of FIG. 1B internally.

Figure 3B:
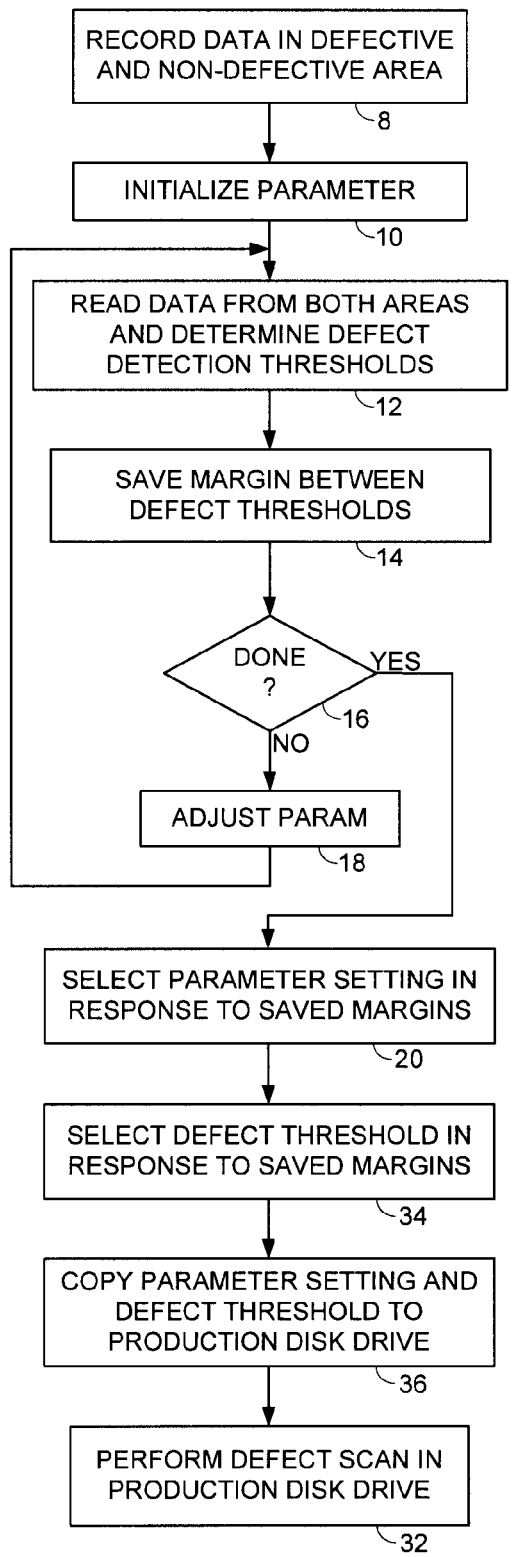
FIG. 3B is a flow diagram according to an embodiment of the present invention wherein a defect threshold is also determined in response to the margins and copied into each production disk drive for performing the defect scan.

In another embodiment, the defect threshold used to perform the defect scan in the production disk drives (i.e., the defect threshold that identifies defective sectors) is selected in response to the margins saved at step 14 of FIG. 1B. For example, the defect threshold may be selected halfway between the defect thresholds corresponding to the first and second data areas (the non-defective and defective data areas) that correspond to the largest margin. Selecting this point for the defect threshold helps ensure that defective sectors are detected while minimizing the number of non-defective sectors falsely detected as defective. In one embodiment, both the parameter setting for the defect scan parameter and the defect threshold are calibrated and then copied to each production disk drive. This embodiment is illustrated in the FIG. 3B which is an extension of the flow diagram of FIG. 3A, wherein at step 34 a defect threshold is selected in response to the saved margins, and at step 36 the parameter setting and the defect threshold are copied to a production disk drive.

Figure 4A:
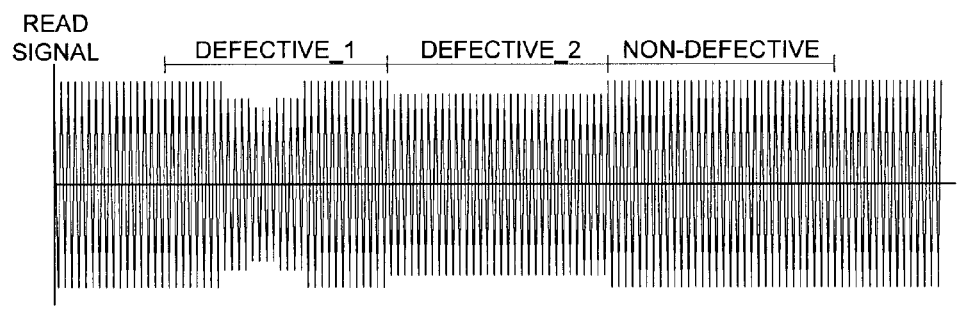
FIG. 4A illustrates a read signal corresponding to a 2T pattern written to two defective data areas and to a non-defective data area.
Figure 4B:
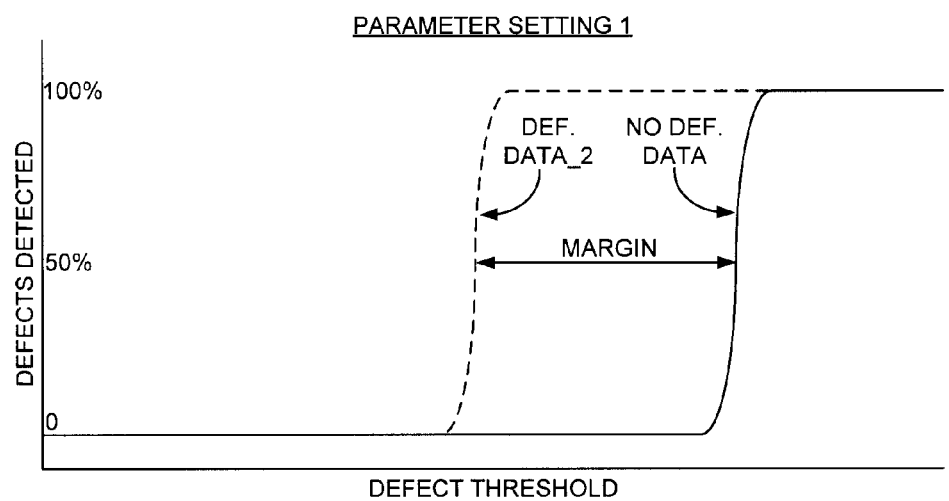
FIG. 4B illustrates a margin between two defect thresholds for the first and third data areas corresponding the first setting of a defect scan parameter, such as the first write current setting.
Figure 4C:
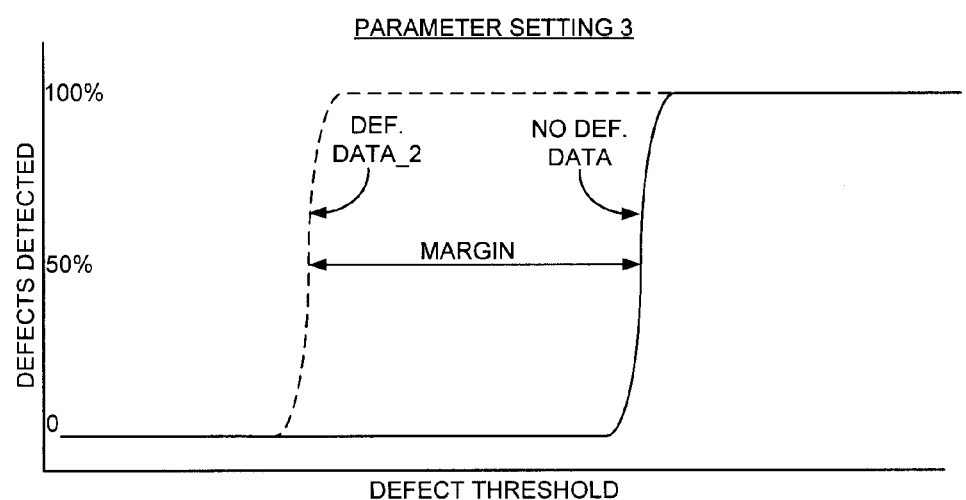
FIG. 4C illustrates a margin between two defect thresholds for the first and third data areas corresponding to a third setting of the defect scan parameter, such as a third write current setting.

FIG. 4A illustrates another embodiment of the present invention wherein a number of defective data areas on the disk are identified, such as a data sector comprising a "deep" defect (DEFECTIVE_1) and a data sector comprising a "shallow" defect (DEFECTIVE_2). FIGS. 4B and 4C illustrate the defect thresholds determined for the non-defective data area and the DEFECTIVE_2 data area for two different parameter settings. The parameter setting of FIG. 4C is selected over the parameter setting of FIG. 4B since the corresponding margin is larger. The final parameter setting is selected relative to the setting selected for each defective data area (e.g., the parameter setting that maximizes the margin for each defective data area). For example, the final parameter setting is selected in response to the parameter setting of FIG. 2C which maximizes the margin for the "deep" defect data area, and the parameter setting of FIG. 4C which maximizes the margin for the "shallow" defect data area. The final parameter setting may be selected, for example, as the average setting out of all of the parameter settings selected for the defective areas.

Figure 5:
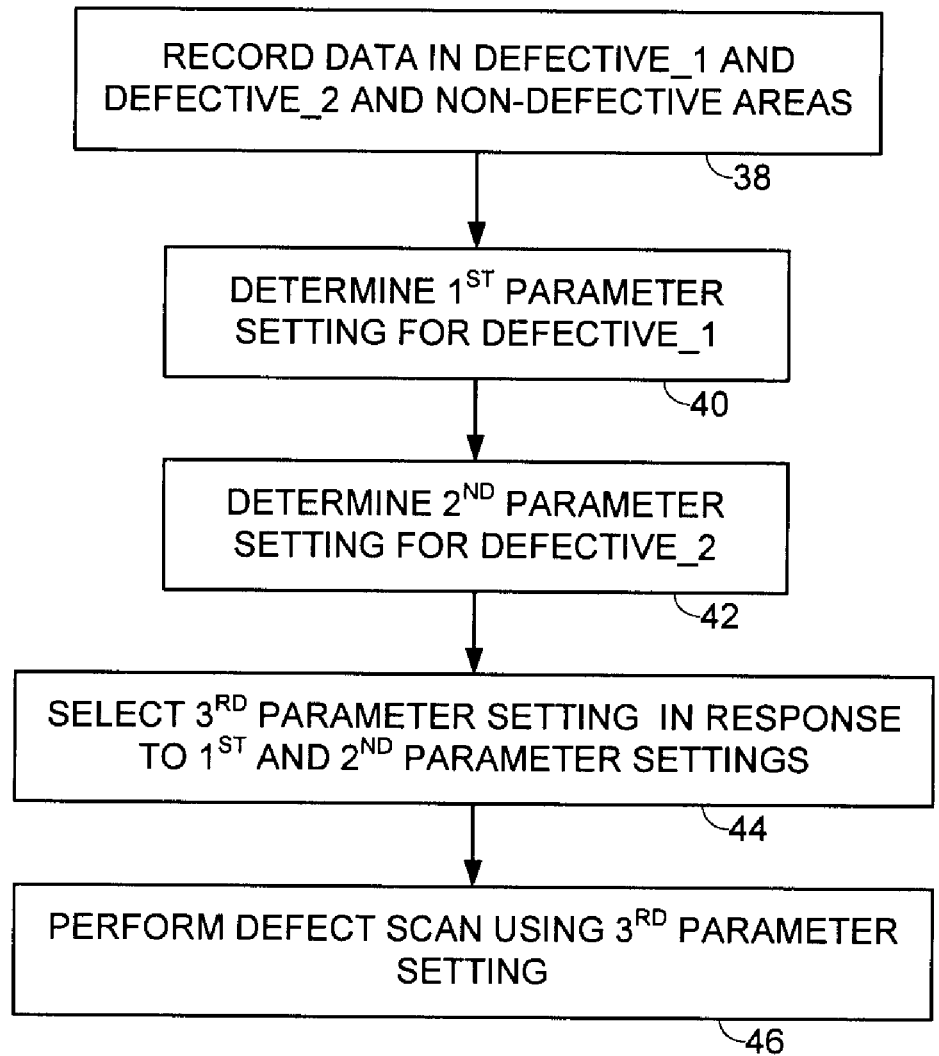
FIG. 5 is a flow diagram according to an embodiment of the present invention wherein the parameter settings selected for the first and second defective data areas are evaluated to select a setting that is used for the defect scan of each production disk drive.

This embodiment is illustrated in the flow diagram of FIG. 5, which may be implemented by control circuitry 6, wherein at step 38 data is recorded in DEFECTIVE_1 data area, DEFECTIVE_2 data area, and a non-defective data area. At step 40 a first parameter setting is selected by reading the DEFECTIVE_1 data area and the non-defective data area according to the flow diagram of FIG. 1B, and at step 42 a second parameter setting is selected by reading the DEFECTIVE_2 data area and the non-defective data area according to the flow diagram of FIG. 1B. At step 44 a third parameter setting is selected in response to the first and second parameter settings, and at step 46 the defect scan is executed by a production disk drive using the third parameter setting.

In one embodiment, the final parameter setting is selected by weighting the parameter settings selected for each defective area based on the likelihood of each defect occurring. For example, in the embodiment illustrated in FIG. 4A, the "deep" defective sectors may comprise 75% of all defective sectors, while the "shallow" defective sectors may comprise 25% of all defective sectors. Accordingly, the equation for selecting the final parameter setting may be biased in a suitable manner to account for the distribution of defects. Similarly, in the embodiment wherein the defect threshold is selected in response to the saved margins, the equation for selecting the defect threshold may be biased in a suitable manner to account for the distribution of defects.

Any number of error types may be evaluated in the embodiments of the present invention in addition to, or instead of, the "deep" defect or "shallow" defect shown in FIG. 4A. Other types of defects may include, for example, "drop-in" defects wherein the amplitude of the read signal increases over the defect, or defects that cause timing errors (phase shift in the read signal). In one embodiment, each production disk drive comprises a plurality of defect detection circuits or algorithms corresponding to different types of defects, and in one embodiment, a defect threshold is calibrated for each type of defect according to the embodiments described above. In yet another embodiment, each production disk drive executes the defect scan in multiple and/or parallel passes, wherein during each pass a particular defect (or defects) is targeted. Prior to each pass, the control circuitry 6 configures the disk drive with a corresponding defect scan parameter setting (or settings) calibrated according to the embodiments described above.

Any suitable control circuitry 6 may be employed in the embodiments of the present invention, such as any suitable integrated circuit or circuits. For example, the control circuitry 6 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or "system on a chip" (SOC). In addition, the control circuitry may include a suitable preamp circuit implemented as a separate integrated circuit, integrated into the read channel or disk controller circuit, or integrated into an SOC. The control circuitry 6 may also include suitable memory for data storage, such as volatile memory like DRAM. Moreover, the control circuitry 6 may use space on the disk 2 for non-volatile memory, such as in reserve tracks.

In one embodiment, the control circuitry 6 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 6 comprises suitable logic circuitry, such as state machine circuitry.

What is claimed is:

1. A method of performing a defect scan for a disk drive, the disk drive comprising a disk, and a head actuated over the disk, the method comprising:
   (a) recording data on a first data area of the disk substantially free from defects and on a second data area of the disk substantially affected by at least one defect;
   (b) initializing a defect scan parameter with an initial setting;
   (c) reading the first data area to determine a first defect threshold, and reading the second data area to determine a second defect threshold;
   (d) saving a margin representing a difference between the first and second defect thresholds;
   (e) adjusting the setting for the defect scan parameter;
   (f) repeating (c) and (d) at least once; and
   (g) selecting a first setting for the defect scan parameter in response to the margins saved at element (d).

2. The method of performing a defect scan as recited in claim 1, wherein the first setting selected for the defect scan parameter corresponds to the maximum saved margin.

3. The method of performing a defect scan as recited in claim 1, wherein the defect scan parameter comprises a write current of the head.

4. The method of performing a defect scan as recited in claim 1, wherein the defect scan parameter comprises a read bias of the head.

5. The method of performing a defect scan as recited in claim 1, wherein the defect scan parameter comprises a fly-height of the head.

6. The method of performing a defect scan as recited in claim 1, wherein the defect scan parameter comprises a write current overshoot of the head.

7. The method of performing a defect scan as recited in claim 1, wherein the defect scan parameter comprises an equalizer parameter for configuring an equalizer circuit.

8. The method of performing a defect scan as recited in claim 1, wherein the defect scan parameter comprises a gain control parameter for configuring a gain control circuit.

9. The method of performing a defect scan as recited in claim 1, further comprising copying the first setting for the defect scan parameter to a production disk drive, and performing the defect scan within the production disk drive in response to the first setting.

10. The method of performing a defect scan as recited in claim 1, further comprising selecting a defect threshold in response to the saved margins.

11. The method of performing a defect scan as recited in claim 10, further comprising copying the selected defect threshold to a production disk drive, and performing the defect scan within the production disk drive.

12. The method of performing a defect scan as recited in claim 1, further comprising:
   (h) recording data on a third data area of the disk substantially affected by at least one defect;
   (i) reading the third data area to determine a third defect threshold;
   (j) saving a margin representing a difference between the first and third defect thresholds;
   (k) adjusting the setting for the defect scan parameter;
   (l) repeating (i) and (j) at least once;
   (m) selecting a second setting for the defect scan parameter in response to the margins saved at element (j);
   (n) selecting a third setting for the defect scan parameter in response to the first and second settings; and
   (o) performing the defect scan in response to the third setting selected for the defect scan parameter.

13. A disk drive comprising:
   a disk comprising a first data area substantially free from defects and a second data area substantially affected by at least one defect;
   a head actuated over the disk; and
   control circuitry operable to:
      (a) initialize a defect scan parameter with an initial setting;
      (b) read the first data area to determine a first defect threshold, and read the second data area to determine a second defect threshold;
      (c) save a margin representing a difference between the first and second defect thresholds;
      (d) adjust the setting for the defect scan parameter;
      (e) repeat (b) and (c) at least once; and
      (f) select a first setting for the defect scan parameter in response to the margins saved at element (c).

14. The disk drive as recited in claim 13, wherein the first setting selected for the defect scan parameter corresponds to the maximum saved margin.

15. The disk drive as recited in claim 13, wherein the defect scan parameter comprises a write current of the head.

16. The disk drive as recited in claim 13, wherein the defect scan parameter comprises a read bias of the head.

17. The disk drive as recited in claim 13, wherein the defect scan parameter comprises a fly-height of the head.

18. The disk drive as recited in claim 13, wherein the defect scan parameter comprises a write current overshoot of the head.

19. The disk drive as recited in claim 13, wherein the defect scan parameter comprises an equalizer parameter for configuring an equalizer circuit.

20. The disk drive as recited in claim 13, wherein the defect scan parameter comprises a gain control parameter for configuring a gain control circuit.

21. The disk drive as recited in claim 13, wherein the control circuitry is further operable to select a defect threshold in response to the saved margins.

22. The disk drive as recited in claim 13, wherein disk further comprises a third data area substantially affected by at least one defect, and the control circuitry is further operable to:
- (g) read the third data area to determine a third defect threshold;
- (h) save a margin representing a difference between the first and third defect thresholds;
- (i) adjust the setting for the defect scan parameter;
- (j) repeat (g) and (h) at least once;
- (k) select a second setting for the defect scan parameter in response to the margins saved at element (h);
- (l) select a third setting for the defect scan parameter in response to the first and second settings; and
- (m) perform a defect scan in response to the third setting selected for the defect scan parameter.

23. A disk drive comprising:
- a disk comprising a first area substantially free from defects and a second data area substantially affected by at least one defect;
- a head actuated over the disk;
- a means for sweeping through a plurality of defect scan parameter values and for reading the first and second data areas to determine a plurality of first and second defect thresholds;
- a means for determining a plurality of margins representing a difference between the first and second defect thresholds; and
- a means for selecting a setting for the defect scan parameter in response to the plurality of margins.

* * * * *